United States Patent [19]

Baur et al.

[11] 4,222,880
[45] Sep. 16, 1980

[54] ARRANGEMENT FOR OPTICAL TRANSMISSION OF COMMUNICATIONS

[75] Inventors: Guenter Baur, Freiburg; Waldemar Greubel, Munich; Rudolf Knauer, Ottobrunn; Hans Krueger, Munich, all of Fed. Rep. of Germany

[73] Assignee: Siemens Aktiengesellschaft, Berlin & Munich, Fed. Rep. of Germany

[21] Appl. No.: 932,569

[22] Filed: Aug. 10, 1978

[30] Foreign Application Priority Data

Sep. 23, 1977 [DE] Fed. Rep. of Germany ....... 2742899

[51] Int. Cl.³ .................... H04B 9/00; H04N 5/33; H04N 5/44; G02B 5/20
[52] U.S. Cl. .................... 455/617; 358/113; 358/194.1; 350/311
[58] Field of Search .......... 250/199, 458; 358/194, 358/113; 350/311, 168; 252/301.1 R; 427/157

[56] References Cited

U.S. PATENT DOCUMENTS

| | | | |
|---|---|---|---|
| 3,426,212 | 2/1969 | Klaas | . |
| 3,927,316 | 12/1975 | Citta | 250/199 |
| 3,928,760 | 12/1975 | Isoda | 358/194 |
| 3,937,949 | 2/1976 | Ishikawa et al. | 250/199 |
| 3,959,655 | 5/1976 | Mauer | 250/474 |
| 4,135,202 | 1/1979 | Cutler | 250/199 |

FOREIGN PATENT DOCUMENTS

| | | |
|---|---|---|
| 2327748 | 12/1973 | Fed. Rep. of Germany . |
| 2257999 | 1/1976 | Fed. Rep. of Germany . |
| 2554226 | 8/1977 | Fed. Rep. of Germany . |

OTHER PUBLICATIONS

"Fluorescent Concentrator for Solar Energy Collection" *Research Disclosure*, Jan. 1975, pp. 20-21.
Hans-Joachim Griese, "Audio auf Infrarot" *Radio Mentor* 42 (1976), pp. 440-442.
"Bright and Economical" *Elektronik-Zeitung*, 3-25-77.
W. Greubel and G. Baur, "The Fluorescence-Activated Display 'FLAD'", Elektronik, 1977, Heft 6, pp. 55-56.

*Primary Examiner*—Robert L. Griffin
*Assistant Examiner*—Edward L. Coles
*Attorney, Agent, or Firm*—Hill, Van Santen, Steadman, Chiara & Simpson

[57] ABSTRACT

An arrangement or device for optical transmission of communications including a light transmitter with an associated receiver characterized by the receiver having a light collecting body having an index of refraction greater than 1 and containing fluorescent materials which absorb the band of light emitted by the transmitter and create a band of light which is not absorbed by the substance and is detected by the receiver. If more than one transmitter is utilized, they are arranged to transmit in different frequency bands and each transmitter has an associated fluorescent substance which will absorb the discrete separate frequency but not the other frequency bands and emit a fluorescent signal which is only detected by the respective receiver for that transmitter. These fluorescent substances can be in separate light collecting bodies or as a mixture in a single body which has more than one receiver attached thereto.

19 Claims, 2 Drawing Figures

ARRANGEMENT FOR OPTICAL TRANSMISSION OF COMMUNICATIONS

BACKGROUND OF THE INVENTION

1. Field of the Invention

The present invention is directed to an arrangement or device for optical transmission of communications. The device or system includes at least one light transmitter with an associate light receiver which is assigned to the transmitter and which includes a light gathering body composed of a material having an index of refraction greater and 1.

2. Prior Art

An arrangement or system for optical transmission of communications, which system or arrangement comprises at least one light transmitter and a light receiver which is assigned to the light transmitter and which includes a light gathering body composed of a material having an index of refraction greater than 1, are known and disclosed in German Auslegeschrift No. 22 57 999 and in an article by Hans-Joachim Griese, *Radio Mentor*, Vol. 42 (1976), No. 11, pgs. 440–442.

Optical signal transmission is used in particular when large quantities of information are to be transmitted by wireless means over a relatively short distance in particular within the limits of an enclosed space. In contrast to electromagnetic radiation, which has wavelengths which are usually found in communication technology, light waves do not, in fact, penetrate through walls and are superior to ultrasonic waves in that they permit higher carrier frequencies and thus, wider band modulations. In addition, light waves are free of disturbing spatial interferences and also cannot be influenced by rattle noises. In spite of these favorable properties, light transmission systems have only been put into practice in a few cases as relatively high power transmitters having a viable degree of efficiency are, in fact, available within the infrared range although one is still confined to small receiver surfaces and must frequently accept a high alien or ambient light component.

For many years now the technical worlds has worked intensively towards increasing the light signal and the signal-to-noise ratio by development of suitable "antenna". As a rule, the concern has been to improve the specific optics such as collector lenses, parabolic reflectors or funnels and low pass filters ("cut-on filters"). It is obvious that the elements of this kind render the transmission device extremely elaborate. In addition to being extremely elaborate, the aforementioned receiver optics will increase the directional effect and necessitate additional provisions such as disclosed in U.S. Pat. No. 3,937,949, which is based on the same priority document as German Offenlegungsschrift No. 2 327 748. Furthermore, when the ambient or surrounding light has a relatively long-wave component and the receiver responds in this range, low-pass filters fundamentally have only a limited efficiency. For example, when using a transmitting diode, the receiver is a Si-photo-diode, and an incandescent light environment will reduce the efficiency of the system or arrangement.

SUMMARY OF THE INVENTION

The aim of the present invention is to provide an optical transmission system or arrangement wherein the noise component is extremely low, wherein the transmitted radiation furthermore can be received from a relatively large space angle range, and in which the system for this purpose only requires a relatively low transmitting power and does not involve an exceptional production outlay or expenses.

To accomplish this task, the present invention is directed to an improvement in an arrangement for optical transmission of communications in which system or arrangement includes at least one light transmitter and a light receiver which is assigned to each of the light transmitters, each of said light receivers being provided with a light gathering body consisting of a material having an index of refraction greater than 1. The improvement is that each of the light gathering bodies contains a fluorescent substance and is provided with at least one light outlet window optically coupled with the respective light receiver. The fluorescent substance has an absorption band which approximately conforms to the emission band of the associated light transmitter and the fluorescent substance has an emission band which does not overlap the absorption band of the substance but is sensed by the light receiver.

As a rule, the absorption band is to be no wider than the useful band or emission band of the transmitter and only in exceptional cases is to exceed the useful band by more than 10 nm towards a higher and/or lower frequency. However, cases are conceivable which, for example, in order to achieve a particularly high signal-to-noise ratio, an extremely narrow absorption band is necessary and, consequently, only a part of the transmitter emission band can excite the fluorescent substance. The division, which is required by the invention between the absorption and emission spectrum of the fluorescent substance, cannot always be precisely adherred to in practice although normally the following relationship should apply. If the band edge can be defined as being located at a wavelength at which the absorption and emission capacity of the fluorescent substance has fallen to 5%, in particular 2%, of the maximum value, the zone common to the two bands should not exceed a width of 10 and at a maximum 15 nm.

The fluorescent body in accordance with the present invention gathers a major part of the transmitted irradiation which is converted into fluorescent light emissions and due to total reflection at the boundary surfaces is directed in the interior of the body and finally output coupled at an increased intensity through the light outlet windows. Here the light amplification factor is in a first approximation which is governed by the ratio of the light gathering body surface to the area of the light outlet window. However, the body surface is not only a collector, which receives transmitted light from virtually all spatial directions but also has a band pass characteristic. As the fluorescent particles, which are dissolved in the body, are basically excited by the emission spectrum of the light transmitter, the body for other frequencies of light constitutes merely a more or less transparent medium which has no light trap effect so that with a frequency matched fluorescent substance, the body is fundamentally subject only to radiation originating from the transmitter. Since it is known that in fluorescent substances, the fluorescent light is generally displaced towards a longer wavelength than that of the excitation light, the light, which reaches the receiver, also generally has a lower frequency than the light emitted from the transmitter. It should be noted that in exceptional cases, the emitted radiation of the fluorescent substance could also have a somewhat shorter wavelength than the irradiated light in which case one refers to a so-called Antistokes lines. Thus, the fluorescent body fulfills a third function, which is that it operates as a frequency converter. This property is particularly valuable insomuch as the relative position in widths of the absorption bands and the emission bands can be freely selected within wide limits. In this way, a plurality of transmitter and receiver, which are not matched in frequency, for example, transmitting diodes having a very high cut-off frequency and infrared receiving diodes can be assigned to one another. If, as perscribed by the invention, the absorption emission bands of the fluorescent substance are separated from one another, no radiation can be lost as a result of self-absorption on its path to the receiver within the fluorescent body. With a given ratio between light gathering body surface and the light emitting surface, optimum amplification conditions can prevail. As a result a transmission arrangement is available, which arrangement satisfies the aforementioned requirements to a much higher degree than previously known comparable systems and which, for the first time, in a series of applications, permits receiving surfaces of < approximately 1 mm² which are to be integrated into a semiconductor surface in a cost favorable fashion or manner.

The incorporation of a fluorescent plate within a system for optical sound recording and reproductions was disclosed in U.S. Pat. No. 3,959,655. However, in this known system, the plate is arranged at the transmitter end and serves merely as a light focusing element. No information is given concerning the nature of the absorption spectrum of the fluorescent particles. The prior art also incorporates devices having fluorescent plates arranged at the receiving end see *Research Disclosure* 29, January 1975, pgs. 20 and 21. In this device, the plate is not part of a communication system but is utilized in a sun collector. Furthermore, a fluorescent plate has already been proposed as a passive brightness amplifier for electro-optical displays as suggested in Baur et al application for U.S. Pat., Ser. No. 747,046, now U.S. Pat. No. 4,075,106 which includes the disclosure of German patent application No. P 25 54 226. The use of the display arrangement is also discussed in articles which cover the work of G. Baur and W. Greubel which article includes "Hell und Sparsam", *Elektronik-Zeitung*, Mar. 25, 1977, and an article in *Elektronic* 6, 1977, pgs. 55–56, which article in particular analyzes the phenomena of self-absorption.

If items of information, which are independent of one another, are to be transmitted on separate channels, the present invention provides a particular advantage as this merely requires different colored transmitters and fluorescent bodies which are excited exclusively by the color of a specific transmitter. In this way, a clean channel separation is achieved without additional selection means. It is irrelevant whether the various receivers have a common sensitivity range or not. Instead of assigning each receiver a separate fluorescent body, it is also possible to utilize a plurality of receivers associated with a common body provided with a mixture of fluorescent substances. However, in this case, it would have to be ensured that the frequency range composed of the absorption band and the emission bands of the individual fluorescent substances are separate from one another and that the receiver is connected at the output ends or windows of the body respond only to the emission light of one single component or substance of the fluorescent mixture.

A few preferred fluorescent substances and their absorption and emission bands are given in the following table. The definition of these bands is not fully precise as the spectra also depends somewhat upon the particular solvent which can consist in particular of a solvent selected for a group consisting of hydrocarbons, alcohols, ethers and mixtures thereof.

| Fluorescent substance | Absorption Band (nm) | Emission Band (nm) |
| --- | --- | --- |
| 9,10-Diazaphenanthrene | 350–450 | 450–590 |
| 35 4-Dimethylamino-4'-nitro-diphenyl | 350–490 | 490–800 |
| 4,5-Benzopiazselenol | 400–520 | 520–660 |
| 3,6-Tetramethyldiamino-N-methylphthalimide | 350–550 | 500–700 |
| Protoporphyrin | 440–630 | 620–720 |
| 3,3,3',3'-Tetramethyl-1,1'-di (4-sulfobutyl)-4,5,4',5'-dibenzoindotricarbocyanine iodide-mono-sodium-salt | 650–850 | 850–1100 |
| 5,5'-Dichloro-11-diphenyl-amino-3,3'-diethyl 10,12-ethylene-thiatricarbo-cyanine-perchlorate | 700–870 | 870–1100 |

The table indicates that all of the compounds possess easily separable bands and, therefore, do not result in disturbing self-absorption even in the case of a relatively long light path in the carrier material. In particular, this also applies to specific inorganic fluorescent materials currently in use as stimulated laser materials. Examples of these materials are glasses doped with rare earths, the chelates thereof and in particular neodynium. These types of glasses are discussed by E. Snitzer and C. G. Young, *Glass Lasers*, pgs. 198–199. Fluorescent substances of this kind can also be used when the fluorescent body is used for purposes other than those of signal transmission.

In a preferred exemplary embodiment, the light transmitter is a LED, which is emissive in the infrared range and has a high degree of efficiency. The light receivers consist of either CdS- or CdSe-photocells.

For a wide-band communication transmission of a video signal, for example, conveyance of an image of a railway platform to a guard's position, wide-band red diodes having a transmission band width of 1 to 5 MHz without frequency modulation and up to 50 MHz with frequency modulation should be used. The red light is transformed by a suitable fluorescent body into a wavelength at which a receiving diode such as Si-diode, has its highest degree of efficiency.

In the proposed arrangement, it is immaterial whether the light, for example, in the permanently installed intercom system, is strongly focused, is less fixed in direction or, however, is distributed in a completely diffused fashion. Examples of strongly focused or less fixed in direction are remote control television and mono/stereo sound transmissions. An example of a completely diffused fashion would occur in the case, for example, of an enclosed area.

Further advantageous embodiments and developments of the invention will be apparent from the following description of a preferred embodiment and from the appended claims.

DESCRIPTION OF THE PREFERRED EMBODIMENTS

Figure 1:
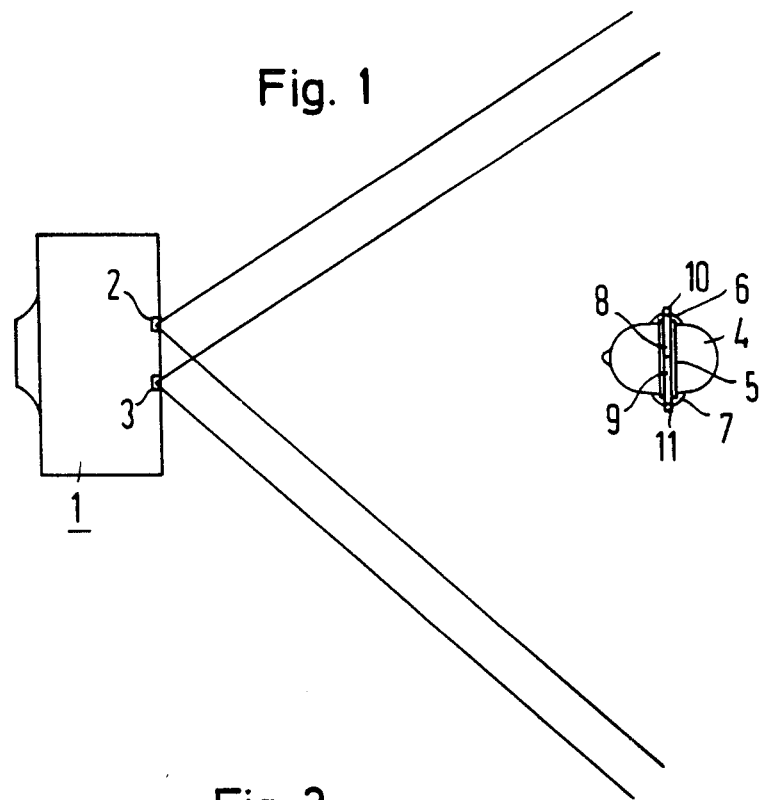
FIG. 1 is a schematic plan view of an arrangement provided with a stereo sound transmission in accordance with the present invention.

The principles of the present invention are particularly useful in a system or arrangement such as illustrated in FIG. 1. In the arrangement, two transmitting diodes 2 and 3, which each serve to transmit a single one of two stereo channels, are mounted on a television 1. The television observer, whose head 4, is illustrated and is wearing a set of headphones comprising a harness 5 and two separate ear pieces or phones 6 and 7. The harness 5 is provided with two cells with the cell 8 coacting with a receiver 10 for the earphone 6 and the cell 9 coacting with a receiver 11 for the earphone 7.

Figure 2:
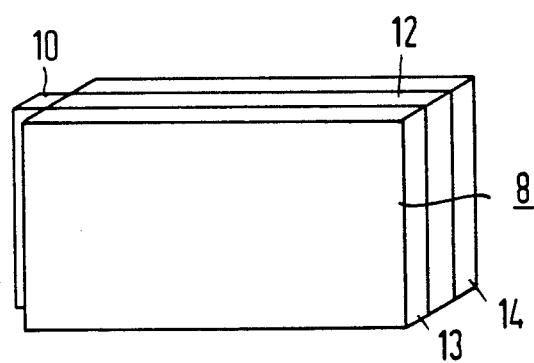
FIG. 2 illustrates a perspective view of a fluorescent plate with the receiver of an embodiment of the present invention.

As best illustrated in FIG. 2, each of the cells such as the cell 8 comprises two parallel carrier plates 13 and 14, which are parallel to one another and spaced from one another by a frame 12 to form an enclosure for receiving a solution containing a fluorescent substance. The frame is designed in such a manner that the fluorescent light is totally reflected on three sides and can only emerge on the fourth surface where the light receiver 10 is arranged. The receiver can also be in direct contact with the solution if desired. In either case, however, it should be ensured, for example, by means of optical contact layers in front of the receiving surface and/or the preceding frame section, that the fluorescent light is input coupled into the receiver with the smallest amount of possible losses.

The light transmitter 2 is a diode, which will emit green light and the transmitter 3 is a diode which will emit red light. A dye such as protoporphyrine, which is absorbent in the range of green light and emits red light is dissolved in the solution contained in the cell 8. The cell 9 contains a dye such as 3,3,3',3'-tetramethyl-1,1'-di (4-sulfobutyl)-4,5,4',5'-dibenzoindotricarbocyanine iodide-mono-sodium-salt. The light receiver, which is assigned to the cell 8 consists of a red sensitive diode and a diode matched to the emission band of the cell 9 is selected for the receiver 11. The arrangement or system can operate with one of the known modulation processes. In the present case it operates with a frequency modulated carrier in the kHz range, which are themselves produced by amplitude modulation of the transmitted light. A detailed representation of this transmission technique is given in the aforementioned publications.

The invention is not necessarily limited to the illustrative exemplary embodiment. Thus, under certain circumstances, it may be advisable to give preferance to a solid carrier material or to deviate from a plate-shape for the fluorescent bodies such as 8 and 9. A decision was made to this effect in particular when a specific space angle sensitivity is to be achieved in the body. Favorable body formations are described in a copending application for U.S. patent, Ser. No. 909,553, which incorporates German Pat. application No. P 27 24 748. Frequently, it is also effective to provide a plurality of receivers with a common fluorescent body. This type of modification is particularly advantageous when it is important that the relative light level in the individual receiver should be influenced as little as possible by tilting of the receiver assembly, for examples, by tilting the headphones. It is also conceivable for the embodiment to include a variation in which a plurality of fluorescent bodies are connected to one single common receiver. If, for example, the useful light is to be considerably displaced in this particular arrangement, the bodies could also form an "optical cascade". However, the proposed realization not only provides for a plurality of constructive modification but also provides a light transmission technique with many new fields of application including not only video and sound transmission but also all forms of short-path remote control. In each individual case on the basis of the concrete factors the technician has a free hand in determining the optimum realization between transmitter power and the area of the receiving unit including the fluorescent body.

Although various minor modifications may be suggested by those versed in the art, it should be understood that we wish to embody within the scope of the patent warranted hereon, all such modifications as reasonably and properly come within the scope of our contribution to the art.

We claim:

1. In an arrangement for optical transmission of communications including at least one light transmitter and a light receiver which is assigned to each of the light transmitters, each of said light receivers being provided with a light gathering means consisting of a body of a material having an index of refraction greater than 1 with the improvement comprising said means converting a major part of the transmitted radiation into a band of different radiation and output coupling the band of different radiation at an increased intensity at an light outlet window optically coupled with the respective light receiver, each of said bodies containing a fluorescent substance and being a fluorescent body, said fluorescent substance having an absorption band, which approximately conforms with the emission band of the associated light transmitter, said fluorescent substance having an emission band which does not overlap the absorption band of said substance but is sensed by the light receiver.

2. In an arrangement according to claim 1, wherein each of said light gathering bodies is a plate-like member having four narrow sides with one of the four narrow sides being the outlet window engaging the light receiver and the other three narrow sides being fully reflective.

3. In an arrangement according to claim 1, wherein the arrangement includes at least two light transmitters each being emissive in a different frequency range and each being assigned a separate light receiver the improvements comprising the fluorescent body for each light receiver containing a fluorescent substance whose absorption band is for the transmitter associated therewith and does not overlap the absorption bands of the fluorescent substances of the other fluorescent bodies.

4. In an arrangement according to claim 1, wherein the arrangement has at least two light transmitters with each transmitter emitting light in a different frequency range than the other and having a separate light receiver associated therewith the improvement including that the light receivers are provided with a common fluorescent body which contains a mixture of different fluorescent substances, said mixture including a separate fluorescent substance associated with each transmitter and having an absorption band for the frequency range of the associated transmitter whereby the frequency bands of said different fluorescent substances, which frequency bands consisting of the absorbtion band and the emission band of a fluorescent substance each, do not overlap.

5. In an arrangement according to claim 1, wherein the fluorescent substance comprises 9,10-diazaphenanthrene.

6. In an arrangement according to claim 1, wherein the fluorescent substance comprises 4-dimethylamino-4'-nitrodiphenyl.

7. In an arrangement according to claim 1, wherein the fluorescent substance comprises 4,5-benzopiazselenol.

8. In an arrangement according to claim 1, wherein the fluorescent substance comprises 3,6-tetramethyl-diamino-N-methylph-thalimide.

9. In an arrangement according to claim 1, wherein the fluorescent substance comprises protoporphyrin.

10. In an arrangement according to claim 1, wherein the fluorescent substance comprises 3,3,3',3'-tetramethyl-1,1'-di (4-sulfobutyl)-4,5,4',5'-dibenzoindotricarbocyanineiodide-mono-sodium-salt.

11. In an arrangement according to claim 1, wherein the fluorescent substance comprises 5,5'-dichloro-11-diphenylamino-3,3'-diethyl-10,12-ethylene-thiatricarbocyanine-perchlorate.

12. In an arrangement according to claim 1, wherein the light gathering body containing a fluorescent substance comprises a glass body doped with rare earth.

13. In an arrangement according to claim 12, wherein the rare earth is neodymium.

14. In an arrangement according to claim 1, wherein the light gathering body is a solution containing the fluorescent substance, said solution being selected from a group consisting of hydrocarbons, alcohols, ethers and mixtures thereof.

15. In an arrangement according to claim 1, wherein the light transmitter is a diode which emits light in the infrared range and in particular a CaAs-diode and wherein the light receiver is a photocell selected from a group consisting of CdS- and CdSe-photocells.

16. In an arrangement according to claim 1, wherein the light transmitter is a diode which emits light in a red range and the light receiver is a Si-diode.

17. In an arrangement according to claim 1, wherein the transmitter transmits video signals, in particular images of a railroad platform to a guard's station.

18. In an arrangement according to claim 1, wherein the transmitter transmits sound transmission in particular the transmission of mono and stereo sound transmission of a broadcasting device selected from a group consisting of television and radio.

19. In an arrangement according to claim 1, wherein the arrangement transmits control signals in particular for a remote control of a television.

* * * * *